United States Patent [19]
Core et al.

[11] Patent Number: 5,826,187
[45] Date of Patent: Oct. 20, 1998

[54] INTEGRATED CORDLESS TELEPHONE WITH TELEPHONE ANSWERING DEVICE AND METHOD OF REPLAYING MESSAGES THROUGH A HANDSET THEREOF

[75] Inventors: Kenneth R. Core, Stanton; Alex Nirshberg, Torrance; Stephen B. Knuth, Mission Viejo; Mark J. Karnowski, Huntington Beach, all of Calif.

[73] Assignee: Casio PhoneMate, Inc., Torrance, Calif.

[21] Appl. No.: 582,163

[22] Filed: Jan. 2, 1996

[51] Int. Cl.$^6$ ............................... H04Q 7/00; H04Q 7/18
[52] U.S. Cl. ........................... 455/412; 455/569; 455/570
[58] Field of Search .................... 455/412, 416, 455/403, 414, 445, 462, 569, 570, 550; 379/67, 70, 74, 89

[56] References Cited

U.S. PATENT DOCUMENTS

| | | | |
|---|---|---|---|
| Re. 34,968 | 6/1995 | Afshar et al. ............................... | 379/67 |
| 3,659,050 | 4/1972 | Carlsson et al. ........................ | 379/420 |
| 4,517,413 | 5/1985 | Pavitt, Jr. ............................ | 379/110.01 |
| 4,677,655 | 6/1987 | Hashimoto ............................. | 455/412 |
| 4,689,813 | 8/1987 | Pleska et al. ............................ | 379/80 |
| 4,756,021 | 7/1988 | Nakayama ............................. | 379/388 |
| 4,881,259 | 11/1989 | Scordato .................................. | 455/412 |
| 5,073,928 | 12/1991 | Shimanuki ............................. | 455/412 |
| 5,163,082 | 11/1992 | Karnowski ............................... | 379/88 |
| 5,220,594 | 6/1993 | Ohnishi et al. .......................... | 455/412 |
| 5,224,151 | 6/1993 | Bowen et al. .......................... | 455/569 |
| 5,321,739 | 6/1994 | Higashiyama .......................... | 455/412 |
| 5,327,481 | 7/1994 | Horimoto ................................. | 455/412 |
| 5,365,573 | 11/1994 | Sakamoto et al. ...................... | 455/412 |
| 5,379,338 | 1/1995 | Umemoto et al. ....................... | 455/570 |
| 5,526,405 | 6/1996 | Toda ........................................ | 455/569 |
| 5,568,538 | 10/1996 | Tamir et al. ............................. | 455/412 |
| 5,572,575 | 11/1996 | Yamamoto et al. ..................... | 455/412 |
| 5,588,041 | 12/1996 | Meyer, Jr. et al. ..................... | 455/569 |
| 5,646,979 | 7/1997 | Knuth ...................................... | 455/563 |

FOREIGN PATENT DOCUMENTS

| | | |
|---|---|---|
| 6-197159 | 7/1994 | Japan . |
| 2 296 629 | 3/1996 | United Kingdom . |

OTHER PUBLICATIONS

Sony Cordless Telephone SPP–X90 Manual; 1993 by Sony Corp.; Japan; pp. 10, 24, 27.

PhoneMate Model 8250 Owner's Guide; published by PhoneMate, Inc. Torrance, CA; Aug. 1992.

PhoneMate Model 8450 Owner's Guide; published by PhoneMate, Inc. Torrance, CA; Jun. 1991.

Primary Examiner—Dwayne D. Bost
Assistant Examiner—Tracy M. Legree
Attorney, Agent, or Firm—Frishauf, Holtz, Goodman, Langer & Chick

[57] ABSTRACT

An integrated cordless telephone and telephone answering device allows a user to selectively replay messages previously recorded on the telephone answering device either through a loudspeaker or through an earpiece, both of which are provided in the cordless handset, as well as locally at the telephone answering device. The loudspeaker is the same loudspeaker that is used when the cordless handset is in a speakerphone mode. When a user wishes to initiate message retrieval through the cordless handset, a PLAY key is pressed which automatically supplies the audio signal to the loudspeaker. If the user then wishes to listen to messages through the earpiece in the cordless handset, a MODE key is pressed which supplies the audio signal to the earpiece. In addition, when the user presses a TALK key, the audio signals from the telephone line are automatically supplied to the earpiece, and finally, when the user presses a SPEAKERPHONE key, the audio signals from the telephone line are automatically supplied to the loudspeaker.

52 Claims, 4 Drawing Sheets

INTEGRATED CORDLESS TELEPHONE WITH TELEPHONE ANSWERING DEVICE AND METHOD OF REPLAYING MESSAGES THROUGH A HANDSET THEREOF

BACKGROUND OF THE INVENTION

The present invention relates to cordless telephones integrated with telephone answering devices and more particularly to an integrated cordless telephone and telephone answering device that allows a user to selectively replay previously recorded messages either through a loudspeaker or through an earpiece, both of which are provided in the cordless telephone handset, as well as locally at the telephone answering device. The integrated cordless telephone and telephone answering device (CITAD) of the present invention incorporates the telephone answering device into the cordless telephone's base unit and has a loudspeaker built into the cordless handset for providing the cordless handset with speakerphone capability.

Cordless telephones are very convenient for the consumer because they do not require that a user remain in one place while they are speaking to another party on the telephone. Also, a cordless handset does not necessarily have to be placed back in its base after each use as a corded handset does. Combining a cordless telephone with a telephone answering device provides a benefit to the consumer because the consumer need only buy one unit, rather than separate cordless telephone and telephone answering devices. One integrated unit also saves space. Speakerphones are also very convenient in that many times a user's hand may be busy and it may not be desirable to pick up the handset to speak, or perhaps more than one person wants to speak to the other party on the telephone line.

Combining a cordless telephone with a telephone answering device and including a speakerphone in the cordless telephone handset provides all of the above benefits. The present invention provides even further benefit by providing the user with the option of listening to his or her messages through the cordless handset and, moreover, allows the user to choose whether to listen to messages through the loudspeaker or through the earpiece, both of which are provided in the cordless telephone handset, as well as locally at the telephone answering device.

Cordless integrated telephone answering devices that allow a user to replay messages through the earpiece of the cordless handset are known in the art (Casio PhoneMate model 2150 for example), as are cordless telephones that incorporate a speakerphone into the cordless handset (Sony model SPP-X90 for example). However, even when these capabilities are combined, it does not automatically enable the user to selectively replay messages through the loudspeaker or the earpiece.

Another example of a cordless integrated telephone answering device that allows a user to replay messages through the earpiece of the cordless handset is disclosed in U.S. Pat. No. 5,220,594 ("Ohnishi et al"). The system disclosed by Ohnishi et al requires three separate units: a first handset, a base unit and a second handset containing the telephone answering machine function. Messages can be replayed over the first handset by pressing a predetermined button on the first handset, whereby a radio frequency (RF) control signal is sent by the first handset to the base unit and then from the base unit to the second handset. This RF signal instructs the telephone answering machine in the second handset to replay any messages that have been previously recorded and transmit the audio signals to the base unit, which then transmits the audio signals to the first handset. The messages can then be heard through the earpiece of the first handset. The Ohnishi et al device does not have a loudspeaker in the first handset, and the recorded messages must be played through the earpiece. In other words, the user must keep the cordless handset next to their ear at all times in order to hear messages through the earpiece. This could be inconvenient and bothersome. In addition, the Ohnishi et al device requires three separate units with three separate receive/transmit circuits which adds to the cost and complexity of the system.

Also known in the art are telephone answering devices integrated with corded telephones that allow the user to replay messages either through a loudspeaker in the base unit or through the earpiece of the corded handset (PhoneMate models 8250 or 8450 for example). U.S. Pat. No. Re. 34,968 ("Afshar et al") discloses such an integrated telephone answering device. In fact, the PhoneMate models mentioned above are commercialized embodiments of the Afshar et al invention.

According to Afshar et al, when the user presses the PLAY button, the message playback will be started. If the user has already picked up the handset, the audio signal will be routed to the handset earpiece. If the handset has not been picked up, the messages will be broadcast through the answering machine's speaker. If the user then picks up the handset, the unit will automatically switch to handset playback mode. (Column 1, line 64 to Column 2, line 3.) The Afshar et al device does not require the actuation of a manual switch, other than the hook switch actuated by the handset. Switching is done automatically depending on the state of the hook switch and whether or not ringing signals are present on the telephone line. When the corded handset is picked up during message playback, the device monitors the telephone line for ringing signals. If ringing signals are present, the audio signals from the telephone line are coupled to the earpiece in the corded handset. If ringing signals are not present, the device continues message playback and couples the audio signals from the telephone answering device to the earpiece in the corded handset. The method of Afshar et al is not applicable to a CITAD because there is no hook switch in the cordless handset and also because the ring detection circuitry is located in the base unit.

SUMMARY OF THE INVENTION

It is an object of the present invention to provide an integrated cordless telephone and telephone answering device that allows a user to listen to messages, previously recorded on the telephone answering device, from the cordless telephone handset.

It is another object of the present invention to provide an integrated cordless telephone and telephone answering device that allows the user to listen to messages through either a loudspeaker or an earpiece, both of which are provided in the cordless telephone handset, as well as locally at the telephone answering device.

It is yet another object of the present invention to provide an integrated cordless telephone and telephone answering device that automatically replays messages through the loudspeaker in the cordless handset when the user presses a PLAY key, which is located on the handset.

It is still another object of the present invention to provide an integrated cordless telephone and telephone answering device that automatically switches from replaying messages through the loudspeaker to replaying messages through the earpiece when the user presses a MODE key, which is located on the handset.

It is a further object of the present invention to enable the loudspeaker message retrieval feature to be added to an integrated cordless telephone and telephone answering device already having a loudspeaker built into the cordless handset for providing the cordless handset with speakerphone capability, without significantly increasing cost or complexity of the integrated cordless telephone and telephone answering device.

Specifically, the present invention combines a cordless telephone, having a speakerphone and an earpiece provided in the cordless handset thereof, with a telephone answering device in such a way so as to allow a user to selectively replay messages through either the loudspeaker or the earpiece in the cordless handset, as well as locally at the telephone answering device itself.

The above and other objects, features and advantages of the present invention will become readily apparent from the following detailed description, which is to be read in conjunction with the accompanying drawings.

DETAILED DESCRIPTION

Figure 1:
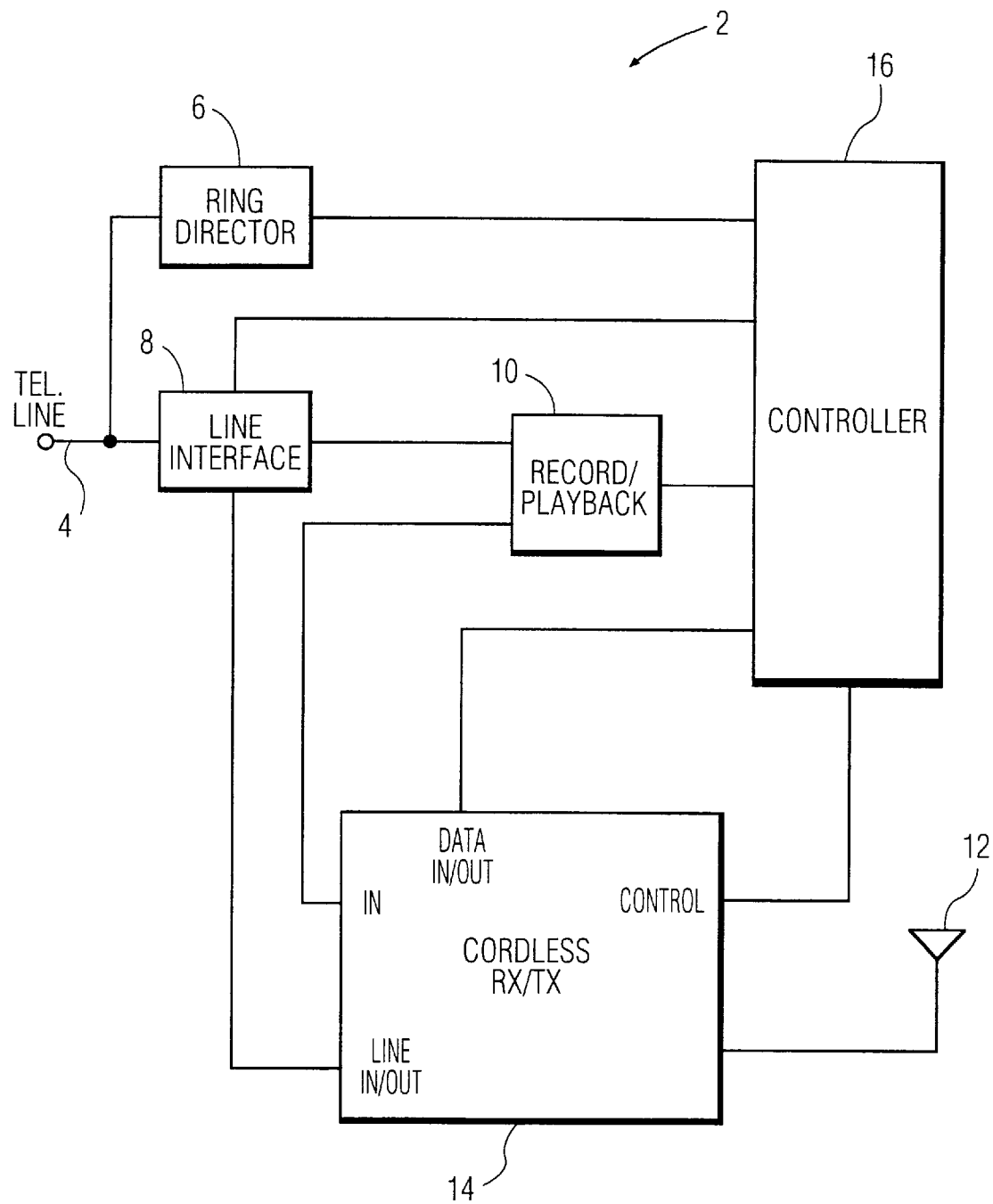
FIG. 1 is a generalized block diagram of a base unit of an integrated cordless telephone and telephone answering device in accordance with the present invention.

The present invention comprises an integrated cordless telephone and telephone answering device (CITAD) that allows a user to selectively replay previously recorded messages either through a loudspeaker or through an earpiece, both of which are provided in the cordless handset, as well as locally at the telephone answering device.

The telephone answering device circuitry is contained in the base unit of the integrated cordless telephone. If, after a predetermined number of rings, a call goes unanswered, the CITAD seizes the telephone line and a pre-recorded outgoing message (OGM) is played to the line. This message usually informs the caller that the owner of the CITAD is unavailable and requests that the caller leave a message. At the conclusion of the OGM, the caller will hear a beep tone which alerts the caller that a message can be recorded. The caller's message is recorded and stored on a record/playback unit, and when the owner of the CITAD returns home, any recorded messages can be replayed at the owner's convenience.

In addition to containing the telephone answering device circuitry, the base unit of the CITAD also contains the circuitry necessary for cordless telephone operations (preferably, much of the circuitry is shared between the two functions to reduce costs). Namely, the CITAD base unit includes ring detector for detecting ringing signals on the telephone line of an incoming telephone call from a central telephone office, a line interface for coupling the CITAD to the telephone line, a radio frequency transmission/reception section for transmitting and receiving signals to and from the cordless handset, and a controller for controlling the ring detector, the line interface, the radio frequency transmission/reception section, and the record/playback unit of the telephone answering device.

The cordless handset of the CITAD includes a receiver having an earpiece and a microphone, a radio frequency transmission/reception section for transmitting and receiving signals to and from the cordless base unit, and a controller for controlling the receiver and radio frequency transmission/reception section. In addition, the CITAD handset also includes a loudspeaker. The loudspeaker is automatically activated when the user wants to listen to messages from the handset and is the same loudspeaker that is used when the handset is in speakerphone mode.

The cordless handset of the CITAD of the present invention has the following user actuated keys (in addition to the TALK key and other conventional keys found on a cordless telephone handset): PLAY, MODE, and SPEAKERPHONE. These user actuated keys are also under control of the controller. When a user presses the PLAY key, the handset transmits a command, via radio frequency (RF), instructing the base unit to replay any messages that were recorded on the record/playback unit. Pressing the PLAY key automatically activates a switch so that the audio signals (transmitted via the radio frequency transmission/reception section in the base) are supplied to the loudspeaker. If the user presses the MODE key while messages are being played over the loudspeaker, the switch is activated again and the audio signals are supplied to the earpiece. If the MODE key is pressed a second time, the audio signals will be re-supplied to the loudspeaker. When the user presses the TALK key, the switch is set so that audio signals from the telephone line are supplied to the earpiece. Finally, when the user presses the SPEAKERPHONE key, the switch is set so that audio signals from the telephone line are supplied to the loudspeaker. As will be explained in detail below, when a user presses either the TALK key or the SPEAKERPHONE key, switching takes place in the base unit and in the handset, but switching only takes place in the handset when the user presses either the PLAY key or the MODE key.

Referring to the drawings in detail, and initially to FIG. 1, the base unit 2 of the cordless telephone of the present invention includes a ring detector 6 and a line interface 8 coupled to a telephone line 4. Ring detector 6 monitors telephone line 4 for the detection of ringing signals sent from the central office, and supplies a signal to a controller 16 in response thereto. Line interface 8 couples the audio signal from the telephone line 4 to the audio circuitry of a record/playback unit 10. Controller 16 thereby controls the operations of ring detector 6, line interface 8, and record/playback unit 10. If a predetermined number of rings occurs with no answer, the line interface circuit 8 (under the control of the controller 16) seizes the telephone line 4 and the record/playback unit 10 plays an outgoing message (OGM) to the line 4. The OGM usually instructs the party calling to leave a message for the owner of the device. After the caller records a message on the record/playback unit 10 and hangs up, the device resets to await the next call.

Figure 2:
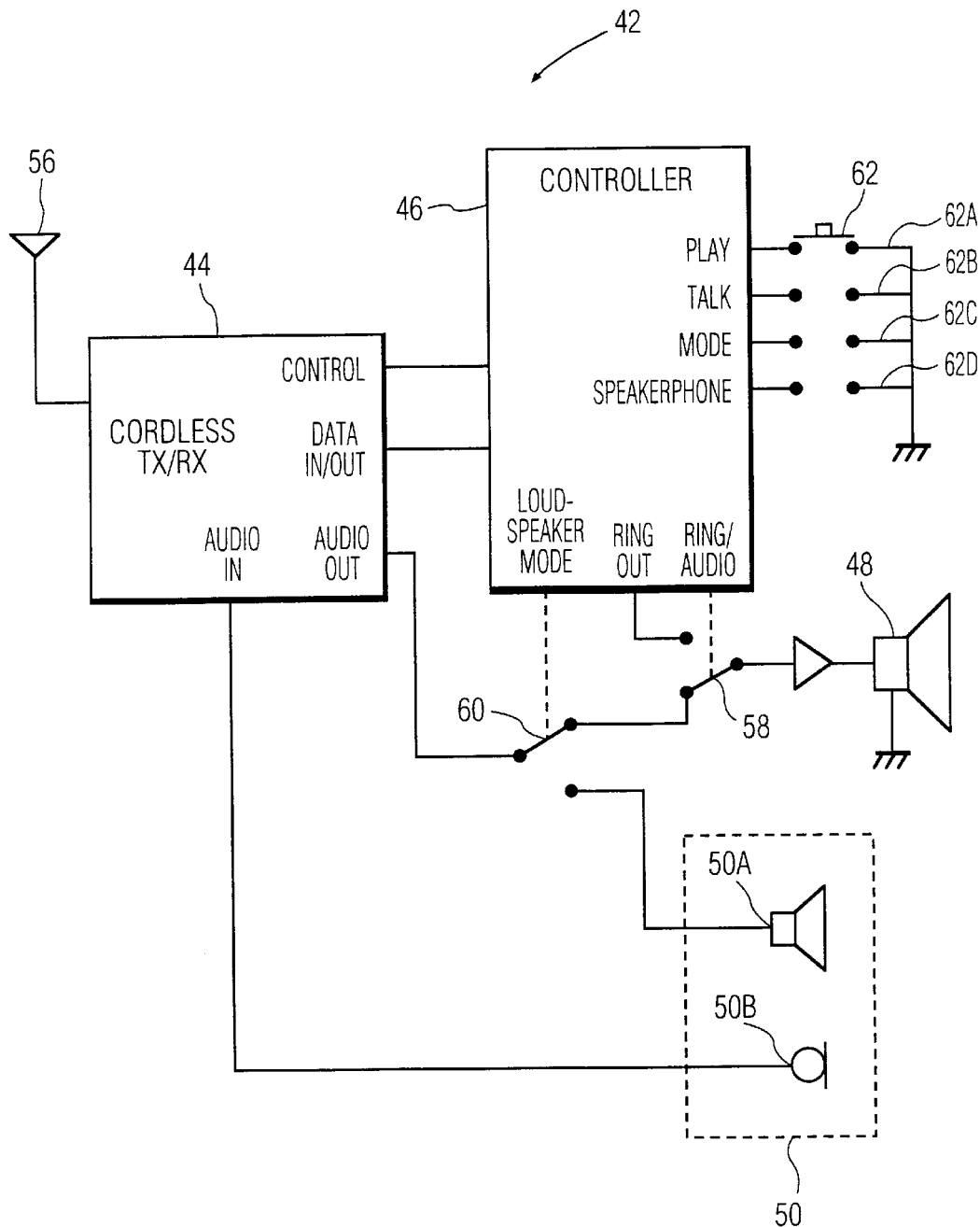
FIG. 2 is a generalized block diagram of a handset unit of an integrated cordless telephone and telephone answering device in accordance with the present invention.

The base unit 2 also contains a cordless RX/TX unit (RF block) 14 for transmitting and receiving radio frequency (RF) signals through antenna 12 to and from the handset unit 42 (shown in FIG. 2). The cordless RX/TX unit 14 is also under control of the controller 16.

Referring now to FIG. 2, the handset unit 42 contains a cordless TX/RX unit (RF block) 44 for transmitting and receiving RF signals through antenna 56 to and from the base unit 2. Signals supplied to cordless TX/RX unit 44 are controlled by a controller 46 in handset 42, so as to selectively supply same to either a loudspeaker 48 or a receiver 50, both of which are provided in the handset 42. Receiver 50 includes an earpiece 50A and a microphone 50B. Microphone 50B is coupled to the AUDIO IN terminal of TX/RX unit 44, while earpiece 50A and loudspeaker 48 are selectively coupled to the AUDIO OUT terminal of TX/RX unit 44 as determined by output switch 60 which is operated under the control of the controller 46. Controller 46 also controls output switch 58 which determines if the output of loudspeaker 48 is a ringing signal or audio.

It will be appreciated that cordless handset 42 of the present invention has four "modes", the operation of these modes being controlled by controller 46 in response to output switch 60 and a user activated mode switch 62. Mode switch 62 is activated when a user presses one of four keys: PLAY key 62A, TALK key 62B, MODE key 62C, or SPEAKERPHONE key 62D. When a user is speaking to another party, output through the cordless handset 42 can either be through the loudspeaker 48 or the earpiece 50A, as determined by output switch 60 in conjunction with user activated SPEAKERPHONE key 62D or TALK key 62B respectively. When a user is listening to messages (previously recorded on record/playback unit 10), output through the cordless handset 42 can either be through the loudspeaker 48 or the earpiece 50A, as determined by output switch 60 in conjunction with the user activated PLAY key 62A or MODE key 62C, respectively.

In operation, when a user wishes to speak to another party through the receiver 50, the TALK key 62B is pressed. The controller 46 then sets output switch 60 so that the AUDIO OUT terminal of TX/RX unit 44 is coupled to the earpiece 50A. Thereafter, audio signals are transmitted and received between TX/RX unit 44 of the handset 42 and RX/TX unit 14 of the base unit 2. When a user wishes to speak to another party through loudspeaker 48, the SPEAKERPHONE key 62D is pressed. The controller 46 then sets output switch 60 so that the AUDIO OUT terminal of TX/RX unit 44 is coupled to the loudspeaker 48. Thereafter, audio signals are transmitted and received between TX/RX unit 44 and RX/TX unit 14.

When a user wishes to listen to messages (previously recorded on record/playback unit 10) through the loudspeaker 48, the PLAY key 62A is pressed. The controller 46 then sets output switch 60 so that the AUDIO OUT terminal of TX/RX unit 44 is coupled to the loudspeaker 48. Simultaneously, TX/RX unit 44 (under control of the controller 46) transmits a command signal to the base unit 2, via radio frequency (RF), instructing the base unit 2 to replay any messages that were recorded on the record/playback unit 10. Thereafter, audio signals from record/playback unit 10 are transmitted from RX/TX unit 14 of the base unit 2 to TX/RX unit 44 of the handset 42. If the user then wishes to listen to messages through the earpiece 50A, the MODE key 62C is pressed. The controller 46 then sets output switch 60 so that the AUDIO OUT terminal of TX/RX unit 44 is coupled to the earpiece 50A. If the user then wishes to listen to messages through the loudspeaker 48, the MODE key 62C is pressed again and the AUDIO OUT terminal of TX/RX unit 44 is re-coupled to the loudspeaker 48. Pressing the PLAY key 62A, to initiate message playback, will automatically cause the audio signals to be initially supplied to the loudspeaker 48. Pressing the MODE key 62C, after message playback has been initiated, will activate output switch 60 and the audio signals will be selectively supplied to either the loudspeaker 48 or the earpiece 50A.

It should also be noted that when a user presses either the TALK key 62B or the SPEAKERPHONE key 62D, switching occurs in the base unit 2 as well as in the handset 42, but that when the user presses either the PLAY key 62A or the MODE key 62C, switching takes place only in the handset 42.

Figure 3:
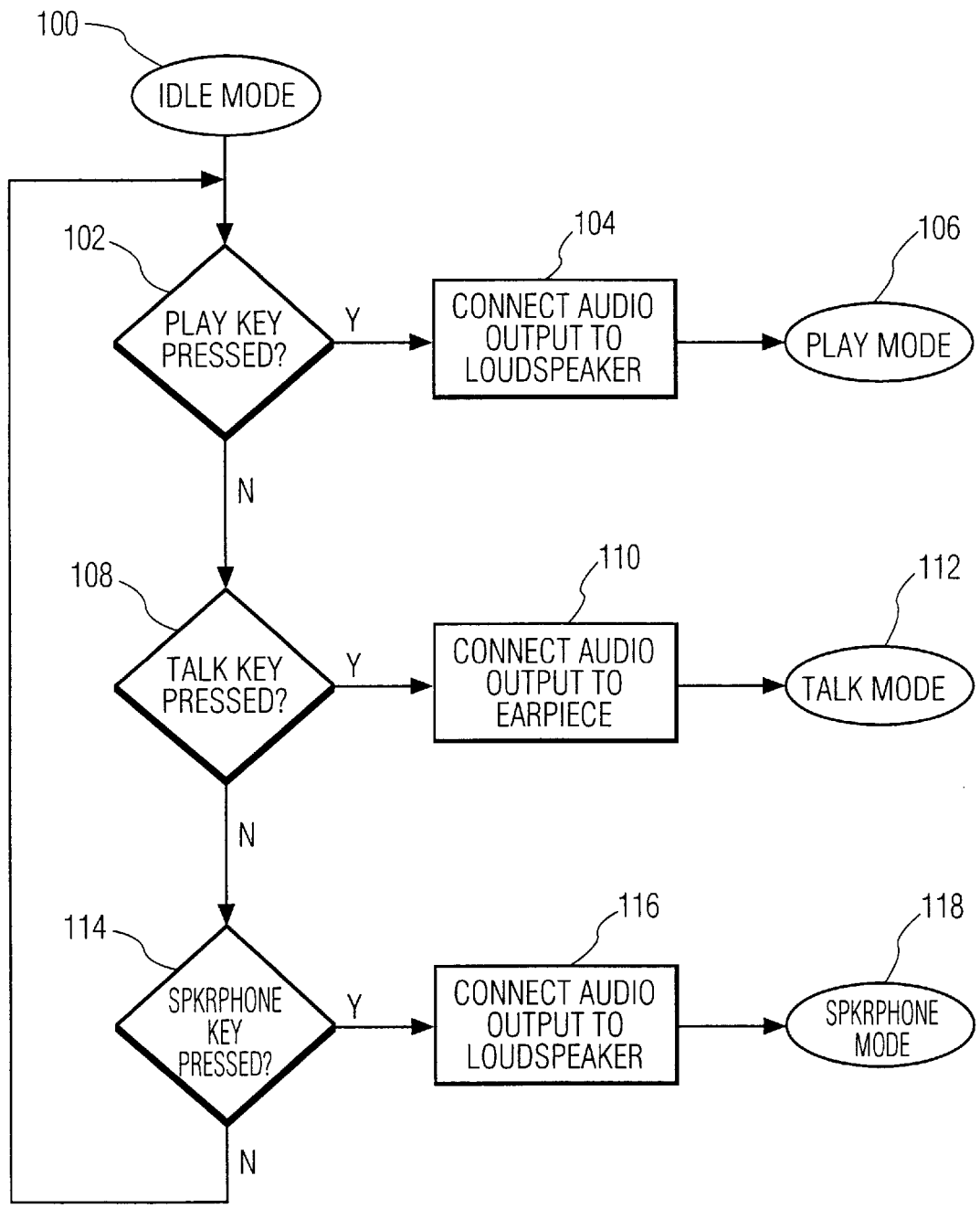
FIG. 3 is a flow diagram showing an idle mode algorithm in accordance with the present invention.
Figure 4:
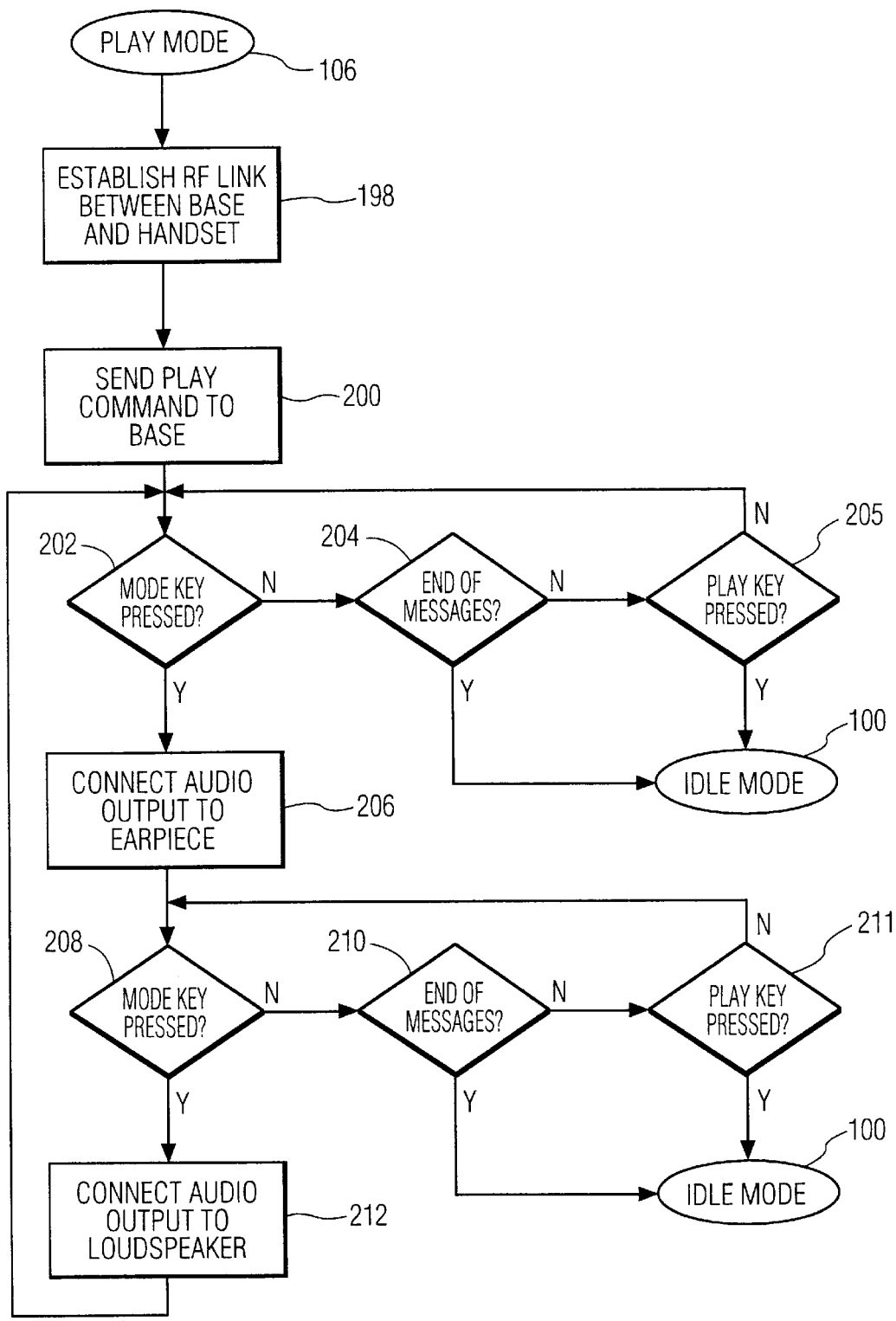
FIG. 4 is a flow diagram showing a cordless handset message playback algorithm in accordance with the present invention.

FIG. 3 is a flow diagram showing an algorithm used by the cordless handset of the present invention when it is in an idle mode. The cordless handset of the present invention enters the idle mode immediately following each use. During the idle mode 100, the handset continually checks for valid key presses (steps 102, 108, 114). If the PLAY key has been pressed (YES in step 102), the audio output is supplied to the loudspeaker (step 104) and the handset enters the play mode (step 106). (The play mode routine is shown in FIG. 4 and is described hereinbelow.) If the PLAY key has not been pressed (NO in step 102), the routine continues to check for other key presses. If the TALK key has been pressed (YES in step 108), the audio output is supplied to the earpiece (step 110) and the handset enters the talk mode (step 112). If the TALK key has not been pressed (NO in step 108), the routine continues to check for other key presses. If the SPEAKERPHONE key has been pressed (YES in step 114), the audio output is supplied to the loudspeaker (step 116) and the handset enters the speakerphone mode (step 118). If the SPEAKERPHONE key has not been pressed (no in step 114), the routine continues to check for other key presses. The talk mode routine and the speakerphone mode routine are well known in the art and will not be discussed. Of course the handset performs other functions during the idle mode, such as ring generation and battery monitoring, but only the functions that pertain to the present invention are shown in FIG. 3.

FIG. 4 is a flow diagram showing an algorithm used by the cordless handset of the present invention during message playback. As described hereinabove, the play mode 106 is entered when a user initiates message playback by pressing the PLAY key 62A on the cordless handset. Pressing the PLAY key always establishes an RF link between the handset and the base unit (step 198) and sends a play command to the base unit (step 200). Pressing the PLAY key automatically initially supplies the audio output to the loudspeaker. While messages are being replayed during the play mode 106, the routine checks to see if the MODE key has been pressed (step 202). If the MODE key has not been pressed (NO in step 202), the device stays in the loudspeaker mode and the routine checks to see if the device has finished replaying all messages (step 204). If messages are still being played (NO in step 204), the routine checks to see if the PLAY key has been pressed (step 205). If the PLAY key has been pressed (YES in step 205), message playback is aborted and the routine returns to the idle mode 100 (discussed above with reference to FIG. 3). If the PLAY key has not been pressed (NO in step 205), the routine returns to step 202 where it continues to check to see if the MODE key has been pressed. When the device has finished replaying all messages (YES in step 204), the routine returns to the idle mode 100. If the MODE key has been pressed (YES in step 202), the device switches to the receiver mode and the audio output is supplied to the earpiece (step 206). The user must now pick up the handset in order to listen to messages. While messages are being replayed through the earpiece, the routine checks to see if the MODE key has been pressed (step 208). If the mode key has not been pressed (NO in step 208), the device stays in the receiver mode and the routine checks to see if the device has finished replaying all messages (step 210). If messages are still being played (NO in step 210), the routine checks to see if the PLAY key has been pressed (step 211). If the PLAY key has been pressed (YES in step 211), message playback is aborted and the routine returns to idle mode 100. If the PLAY key has not been pressed (NO in step 211), the routine returns to step 208 where it continues to check to see if the MODE key has been pressed. When the device has finished replaying all messages (YES in step 210), the routine returns to the idle mode 100. If the MODE key has been pressed (YES in step 208), the device switches to the loudspeaker mode and the audio output is supplied to the loudspeaker (step 212). The user can now put the handset down and listen to messages through the loudspeaker. The routine then returns to step 202 where it continues to check to see if the MODE key has been pressed. The user can press the MODE key as many times as desired, thereby switching between the loudspeaker mode and the receiver mode, until all recorded messages have been played.

The CITAD of the present invention performs switching of modes in a manner that is intuitive to the user. When a user presses the PLAY key on a conventional telephone answering device, it is generally expected that the audio signals will be supplied to a loudspeaker, and when a user presses the TALK key on a cordless handset, it is generally expected that the audio signals from the telephone line will be supplied to the earpiece. In keeping with the above, pressing the PLAY key on the CITAD handset of the present invention automatically defaults to supplying the audio signals to the loudspeaker, and pressing the TALK key automatically defaults to supplying the audio signals to the earpiece. When a user of the CITAD of the present invention wishes to listen to messages from the handset, it is not necessary to wonder what mode the cordless handset was left in the last time it was used. Pressing PLAY will automatically broadcast messages through the loudspeaker. If it is desired to listen to messages through the earpiece (for privacy) the MODE key can be simply pressed. In short, the keys are intuitive and easily understood by a user.

The record/playback unit 10 may be of the all digital type, for example as shown in U.S. Pat. No. 5,163,082, or it may be of the tape recorder type or it may be a combination unit having a digital outgoing message (OGM) and a tape recorder for incoming messages.

Having described a specific preferred embodiment of the invention with reference to the accompanying drawings, it will be appreciated that the present invention is not limited to that specific embodiment, and that various modifications can be effected thereto by one of ordinary skill in the art without departing from the scope or spirit of the invention, as defined in the appended claims.

What is claimed is:

1. An integrated cordless telephone and telephone answering device comprising:
    ring detector means for detecting ringing signals on a telephone line of an incoming telephone call from a central telephone office;
    record and playback means for recording a message and playing back a recorded message;
    line interface means for coupling said record and playback means to said telephone line;
    a handset having an earphone, loudspeaker and a microphone; and
    controller means for controlling said ring detector means, said record and playback means and said line interface means such that a recorded message recorded on said record and playback means is selectively played back and broadcast over one of said loudspeaker and said earphone.

2. The integrated cordless telephone and telephone answering device according to claim 1, further comprising:
    a base unit comprising said ring detector means, said record and playback means and said line interface means.

3. The integrated cordless telephone and telephone answering device according to claim 2, wherein said controller means includes:
    a first controller in said base unit for controlling said ring detector means, said line interface means and said record and playback means; and
    a second controller in said handset for controlling said loudspeaker and said earphone.

4. The cordless telephone and telephone answering device according to claim 3, further comprising:
    first radio frequency transmission/reception means in said base unit for transmitting a signal to said handset; and
    second radio frequency transmission/reception means in said handset for receiving said signal transmitted from said base unit and selectively supplying said signal from said base unit to one of said loudspeaker and said earphone.

5. The cordless telephone and telephone answering device according to claim 4, wherein said signal transmitted from said base unit comprises an audio signal.

6. The cordless telephone and telephone answering device according to claim 5, wherein
    said second radio frequency transmission/reception means in said handset comprises means for transmitting a signal to said base unit; and
    said first radio frequency transmission/reception means in said base unit comprises means for receiving said signal transmitted from said handset and supplying said signal transmitted from said handset to said first controller in said base unit.

7. The cordless telephone and telephone answering device according to claim 6, wherein said signal transmitted from said handset comprises a data signal.

8. The cordless telephone and telephone answering device according to claim 7, wherein said first controller in said base unit comprises means responsive to said data signal for activating said record and playback means to playback a recorded message.

9. The cordless telephone and telephone answering device according to claim 8, further comprising output switch means for selectively supplying an audio signal to one of said loudspeaker and said earphone.

10. The cordless telephone and telephone answering device according to claim 9, further comprising mode switch means for switching said handset to be set in one of:
    (a) a play mode in which an audio signal from said record and playback means is supplied to said loudspeaker;
    (b) a receiver mode in which the audio signal from said record and playback means is supplied to said earphone;
    (c) a talk mode in which an audio signal from the telephone line is supplied to said earphone; and
    (d) a speakerphone mode in which the audio signal from the telephone line is supplied to said loudspeaker.

11. The cordless telephone and telephone answering device according to claim 10, wherein said second controller in said handset comprises means for operating responsive to operation of said mode switch means.

12. The cordless telephone and telephone answering device according to claim 11, wherein said second controller in said handset comprises means for automatically controlling said output switch means to initially supply the audio signal from said record and playback means to said loudspeaker.

13. The cordless telephone and telephone answering device according to claim 12, wherein said second controller in said handset earphone comprises means for automatically controlling said output switch means to initially supply the audio signal from the telephone line to said earphone.

14. The cordless telephone and telephone answering device according to claim 13, wherein said mode switch means comprises user activated keys for activating said play mode, said receiver mode, said talk mode, and said speakerphone mode.

15. The cordless telephone and telephone answering device according to claim 14, wherein said second controller in said handset comprises means for controlling said output switch means responsive to activation of said user activated keys.

16. The cordless telephone and telephone answering device according to claim 2, further comprising mode switch means for switching said handset to be set in one of:
 (a) a play mode in which an audio signal from said record and playback means is supplied to said loudspeaker;
 (b) a receiver mode in which the audio signal from said record and playback means is supplied to said earphones;
 (c) a talk mode in which an audio signal from the telephone line is supplied to said earphones; and
 (d) a speakerphone mode in which the audio signal from the telephone line is supplied to said loudspeaker.

17. The cordless telephone and telephone answering device according to claim 16, wherein said controller means comprises means for operating responsive to operation of said mode switch means.

18. The cordless telephone and telephone answering device according to claim 17, wherein said mode switch means comprises user activated keys for activating said play mode, said receiver mode, said talk mode and said speakerphone mode.

19. The cordless telephone and telephone answering device according to claim 18, wherein said controller means comprises means for operating responsive to activation of said user activated keys.

20. The cordless telephone and telephone answering device according to claim 2, wherein said base unit comprises means for broadcasting a recorded message played back by said record and playback means.

21. The cordless telephone and telephone answering device according to claim 1, wherein the earphone and loudspeaker are separate components and separately operable.

22. An integrated cordless telephone and telephone answering device comprising:
 a base unit comprising:
  a ring detector for detecting ringing signals on a telephone line of an incoming telephone call from a central telephone office;
  a recorder and playback device for recording a message and playing back the recorded message; and
  a line interface for coupling said record and playback device to said telephone line;
 a handset having an earphone, loudspeaker and a microphone;
 a controller for controlling said ring detector, said recorder and playback device and said line interface such that the recorded message is selectively played back and broadcast over one of said loudspeaker and said earphone, said controller comprising:
  a first controller in said base unit for controlling said ring detector, said line interface and said recorder and playback device; and
  a second controller in said handset for controlling said loudspeaker, said earphone and said microphone;
 a first radio frequency transmitter/receiver in said base unit for transmitting an audio signal to said handset;
 a second radio frequency transmitter/receiver in said handset for receiving said signal transmitted from said base unit and selectively supplying said signal transmitted from said base unit to one of said loudspeaker and said earphone, said second radio frequency transmitter/receiver in said handset comprising a transmitter for transmitting a data signal to said base unit;
 an output switch for selectively supplying the audio signal to one of said loudspeaker and said earphone; and
 a mode switch for switching said handset to be set in one of:
  (a) a play mode in which an audio signal from said recorder and playback device is supplied to said loudspeaker;
  (b) a receiver mode in which the audio signal from said recorder and playback device is supplied to said earphone;
  (c) a talk mode in which an audio signal from the telephone line is supplied to said earphone; and
  (d) a speakerphone mode in which the audio signal from the telephone line is supplied to said loudspeaker;
 wherein said first radio frequency transmitter/receiver comprises a receiver for receiving said signal transmitted from said handset and for supplying said signal transmitted from said handset to said first controller in said base unit; and
 wherein said first controller is responsive to said data signal for activating said recorder and playback device to playback a recorded message.

23. The cordless telephone and telephone answering device according to claim 22, wherein said second controller in said handset is responsive to operation of said mode switch.

24. The cordless telephone and telephone answering device according to claim 23, wherein said second controller in said handset automatically controls said output switch to initially supply the audio signal from said recorder and playback device to said loudspeaker.

25. The cordless telephone and telephone answering device according to claim 24, wherein said second controller in said handset automatically controls said output switch to initially supply the audio signal from the telephone line to said earphone.

26. The cordless telephone and telephone answering device according to claim 25, wherein said mode switch comprises user activated keys for activating said play mode, said receiver mode, said talk mode, and said speakerphone mode.

27. The cordless telephone and telephone answering device according to claim 26, wherein said second controller in said handset controls said output switch responsive to activation of said user activated keys.

28. An integrated cordless telephone and telephone answering device comprising:
 a base unit comprising:

a ring detector for detecting ringing signals on a telephone line of an incoming telephone call from a central telephone office;

a recorder and playback device for recording a message and playing back the recorded message; and a line interface for coupling said recorder and playback device to said telephone line;

a handset having an earphone, loudspeaker and a microphone;

a controller for controlling said ring detector, said recorder and playback device and said line interface such that the recorded message is selectively played back and broadcast over one of said loudspeaker and said earphone; and a mode switch for switching said handset to be set in one of:

(a) a play mode in which an audio signal from said recorder and playback device is supplied to said loudspeaker;

(b) a receiver mode in which the audio signal from said recorder and playback device is supplied to said earphone;

(c) a talk mode in which an audio signal from the telephone line is supplied to said earphone; and (d) a speakerphone mode in which the audio signal from the telephone line is supplied to said loudspeaker.

29. The cordless telephone and telephone answering device according to claim 28, wherein said controller is responsive to operation of said mode switch.

30. The cordless telephone and telephone answering device according to claim 29, wherein said mode switch comprises user activated keys for activating said play mode, said receiver mode, said talk mode and said speakerphone mode.

31. The cordless telephone and telephone answering device according to claim 30, wherein said controller is responsive to activation of said user activated keys.

32. An integrated cordless telephone and telephone answering device comprising:

a ring detector for detecting ringing signals on a telephone line of an incoming telephone call from a central telephone office;

a recorder and playback device for recording a message and playing back the recorded message;

a line interface for coupling said record and playback means to said telephone line;

a handset having an earphone, loudspeaker and a microphone; and a controller for controlling said ring detector, said recorder and playback device and said line interface such that the recorded message is selectively played back and broadcast over one of said loudspeaker and said earphone.

33. The integrated cordless telephone and telephone answering device according to claim 32, further comprising:

a base unit comprising said ring detector, said recorder and playback device and said line interface.

34. The integrated cordless telephone and telephone answering device according to claim 33, wherein said controller comprises:

a first controller in said base unit for controlling said ring detector, said line interface and said recorder and playback device; and a second controller in said handset for controlling said loudspeaker and said earphone.

35. The cordless telephone and telephone answering device according to claim 34, further comprising:

a first radio frequency transmitter/receiver in said base unit for transmitting a signal to said handset; and a second radio frequency transmitter/receiver in said handset for receiving said signal transmitted from said base unit. and for selectively supplying said signal from said base unit to one of said loudspeaker and said earphone.

36. The cordless telephone and telephone answering device according to claim 35, wherein said signal transmitted from said base unit comprises an audio signal.

37. The cordless telephone and telephone answering device according to claim 36, wherein:

said second radio frequency transmitter/receiver in said handset comprises a transmitter for transmitting a signal to said base unit; and wherein said first radio frequency transmitter/receiver in said base unit comprises a receiver for receiving said signal transmitted from said handset and for supplying said signal transmitted from said handset to said first controller in said base unit.

38. The cordless telephone and telephone answering device according to claim 37, wherein said signal transmitted from said handset comprises a data signal.

39. The cordless telephone and telephone answering device according to claim 38, wherein said first controller in said base unit is responsive to said data signal for activating said recorder and playback device to playback the recorded message.

40. The cordless telephone and telephone answering device according to claim 39, further comprising an output switch for selectively supplying the audio signal to one of said loudspeaker and said earphone.

41. The cordless telephone and telephone answering device according to claim 38, further comprising a mode switch for switching said handset to be set in one of:

(a) a play mode in which an audio signal from said record and playback device is supplied on said loudspeaker;

(b) a receiver mode in which the audio signal from said record and playback device is supplied to said earphone;

(c) a talk mode in which an audio signal from the telephone line is supplied to said earphone; and (d) a speakerphone mode in which the audio signal from the telephone line is supplied to said loudspeaker.

42. The cordless telephone and telephone answering device according to claim 41, wherein said second controller in said handset is responsive to operation of said mode switch.

43. The cordless telephone and telephone answering device according to claim 42, wherein said second controller in said handset automatically controls said output switch to initially supply the audio signal from said record and playback device to said loudspeaker.

44. The cordless telephone and telephone answering device according to claim 43, wherein said second controller in said handset automatically controls said output switch to initially supply the audio signal from the telephone line to said earphone.

45. The cordless telephone and telephone answering device according to claim 44, wherein said mode switch comprises user activated keys for activating said play mode, said receiver mode, said talk mode, and said speakerphone mode.

46. The cordless telephone and telephone answering device according to claim 45, wherein said second controller in said handset controls said output switch responsive to activation of said user activated keys.

47. The cordless telephone and telephone answering device according to claim 33, further comprising a mode switch for switching said handset to be set in one of:
   (a) a play mode in which an audio signal from said recorder and playback device is supplied to said loudspeaker;
   (b) a receiver mode in which the audio signal from said recorder and playback device is supplied to said earphone;
   (c) a talk mode in which an audio signal from the telephone line is supplied to said earphone; and
   (d) a speakerphone mode in which the audio signal from the telephone line is supplied to said loudspeaker.

48. The cordless telephone and telephone answering device according to claim 47, wherein said controller is responsive to operation of said mode switch.

49. The cordless telephone and telephone answering device according to claim 48, wherein said mode switch comprises user activated keys for activating said play mode, said receiver mode, said talk mode and said speakerphone mode.

50. The cordless telephone and telephone answering device according to claim 49, wherein said controller is responsive to activation of said user activated keys.

51. The cordless telephone and telephone answering device according to claim 33, wherein said base unit broadcasts a recorded message played back by said record and playback means.

52. The cordless telephone and telephone answering device according to claim 32, wherein the earphone and loudspeaker are separate components and separately operable.

* * * * *

UNITED STATES PATENT AND TRADEMARK OFFICE
CERTIFICATE OF CORRECTION

PATENT NO. : 5,826,187
DATED : October 20, 1998
INVENTOR(S) : CORE et al.

It is certified that error appears in the above-identified patent and that said Letters Patent is hereby corrected as shown below:

<u>In the DRAWINGS,</u>

Column 9, line 7 (claim 13, line 3), after
"in said handset" delete "earphone";

Column 12, line 36 (claim 41, line 2), change
"to claim 38" to --to claim 40--;

Signed and Sealed this

Thirteenth Day of March, 2001

Attest:

NICHOLAS P. GODICI

Attesting Officer    Acting Director of the United States Patent and Trademark Office